United States Patent
Barthel et al.

(10) Patent No.: US 6,806,433 B2
(45) Date of Patent: Oct. 19, 2004

(54) HIGH-STRENGTH EROSION ELECTRODE

(75) Inventors: Bernd Barthel, Herborn (DE); Heinrich Groos, Herborn (DE); Hans Hermanni, Sinn-Fleisbach (DE); Klaus Tauber, Biebertal (DE)

(73) Assignee: Berkenhoff GmbH, Heuchelheim (DE)

( * ) Notice: Subject to any disclaimer, the term of this patent is extended or adjusted under 35 U.S.C. 154(b) by 0 days.

(21) Appl. No.: 09/919,537

(22) Filed: Jul. 31, 2001

(65) Prior Publication Data

US 2001/0045412 A1 Nov. 29, 2001

Related U.S. Application Data

(63) Continuation-in-part of application No. 09/202,221, filed as application No. PCT/EP97/04595 on Aug. 22, 1997, now Pat. No. 6,448,527.

(30) Foreign Application Priority Data

Sep. 4, 1996 (DE) .......................................... 196 35 775

(51) Int. Cl.$^7$ ................................................. B23H 1/00
(52) U.S. Cl. ................................. 219/69.12; 219/69.11; 219/69.17
(58) Field of Search .......................... 219/69.12, 69.11, 219/69.1, 69.15, 69.17

(56) References Cited

U.S. PATENT DOCUMENTS

| | | | |
|---|---|---|---|
| 4,287,404 A | 9/1981 | Convers et al. | .......... 219/69 W |
| 4,686,153 A | 8/1987 | Tominaga et al. | .......... 428/610 |
| 4,935,594 A | 6/1990 | Groos et al. | .............. 219/69.12 |
| 4,988,552 A | 1/1991 | Tomalin | ...................... 428/677 |

FOREIGN PATENT DOCUMENTS

| | | |
|---|---|---|
| DE | 29 06 245 | 9/1979 |
| EP | 0 185 492 | 6/1986 |

OTHER PUBLICATIONS

ASM Glossary of Metallurgical Terms and Engineering Tables p. 69.*

* cited by examiner

Primary Examiner—M. Alexandra Elve
(74) Attorney, Agent, or Firm—Flynn, Thiel, Boutell & Tanis, P.C.

(57) ABSTRACT

The invention concerns a high-strength erosion electrode having good electrical conductivity. The erosion electrode is made up of a steel core, an intermediate layer of copper or a copper-containing alloy, and an outer layer containing at least 40% zinc or, alternatively, a steel core and a zinc alloy outer layer having a zinc content of from 40–60%. The steel core has a patented structure which contains between 0.6 and 1 wt. % carbon and occupies an area corresponding to between 50 and 75% of the erosion electrode diameter, the intermediate layer occupying an area of between 5 and 40% of the total diameter, the outer layer occupying an area of between 10 and 30%, and the zinc content of the outer layer being between 40 and 60 wt. %. In the alternative embodiment, the steel core occupies an area corresponding to between 50 and 75% of the erosion electrode diameter and the outer layer occupies the balance.

7 Claims, 1 Drawing Sheet

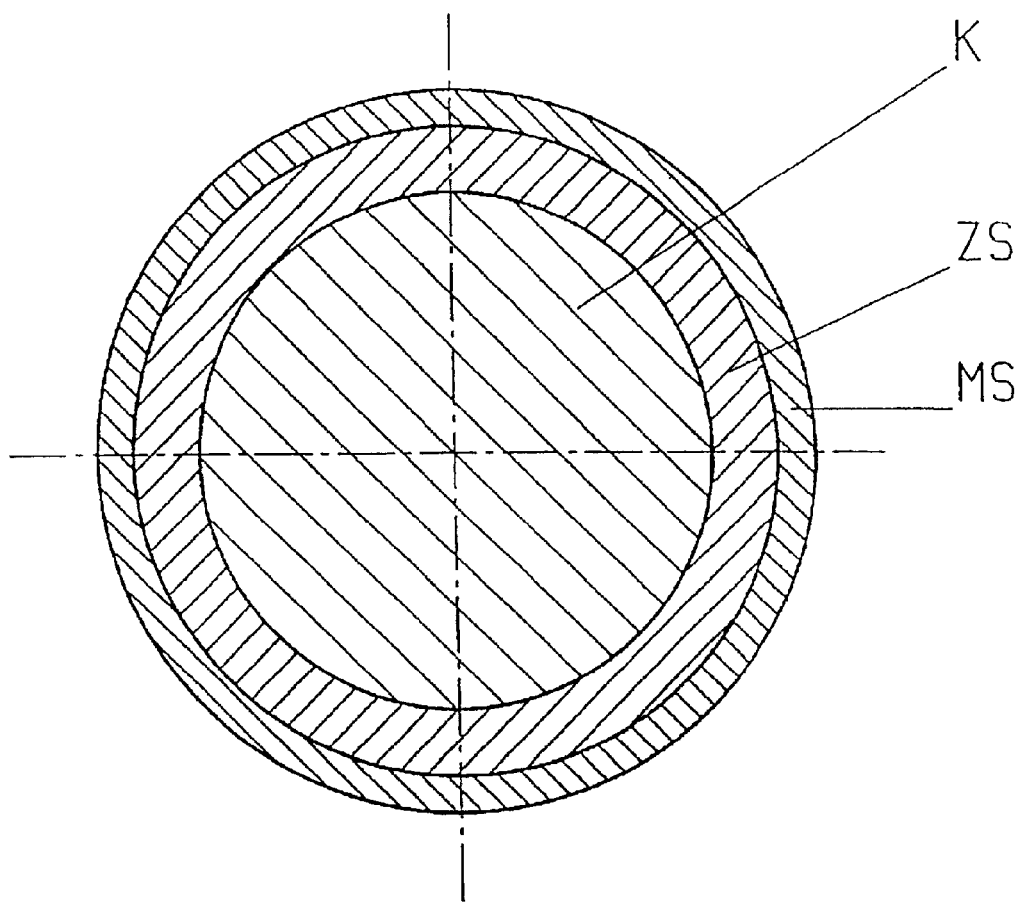

HIGH-STRENGTH EROSION ELECTRODE

This application is a continuation-in-part of U.S. Ser. No. 09/202 221, filed Dec. 9, 1998 now U.S. Pat. No. 6,448,527, filed as a PCT/EP97/04595 filed on Aug. 22, 1997.

FIELD OF THE INVENTION

The invention relates to a method for the manufacture of a wire electrode for the spark-erosion process and a wire electrode for this method, which consists of a core of steel, an intermediate layer of copper or a high copper-containing alloy, and an outer layer with at least 40% zinc or a core of steel and a zinc alloy outer layer having a zinc content of from 40–60%.

BACKGROUND OF THE INVENTION

Wire electrodes, which are designed with multiple layers, which have a core of steel, an intermediate layer of copper arranged around the core, and an outer zinc-containing layer, are known, for example, from the DE-PS 29 06 245. All known wire electrodes, which are constructed with a steel core, do indeed have an increased strength compared with copper or brass electrodes, however, all of these erosion electrodes have the disadvantage that if they have comparatively high strengths, their electrical conductivity is very low and merely reaches 8 S·m/mm². This comparatively high tensile strength is particularly advantageous for the cutting of high or thick workpieces or, however, also for the cutting of very small parts since high wire tensions are here demanded. However, these known wire electrodes have the disadvantage that their erosion performance is relatively low. In particular, in the case of cutting very small parts with erosion-wire diameters of up to 10 $\mu$m, high wire strengths are demanded in order to reduce deflection and vibration of the wire to a minimum. Tungsten or molybdenum wires have been used up to now for the cutting of very small parts with wire thicknesses of 100 $\mu$m and less, however, tungsten or molybdenum wires are extremely expensive to manufacture. Erosion wires with a steel core and a brass outer layer have been unable to be successful up to now for this purpose since they always, in comparison to tungsten wires, showed a lesser strength and a poorer erosion behavior.

SUMMARY OF THE INVENTION

The basic purpose of the invention is to provide high-strength erosion electrodes with a core of steel of the abovementioned type and a method for their manufacture, which electrodes have strengths which are 1800 N/mm² and higher and, in addition, have a comparatively high conductivity of 10 S·m/mm² and more.

BRIEF DESCRIPTION OF THE DRAWING

The single drawing FIGURE illustrates cross-section of the inventive wire.

DETAILED DESCRIPTION

This purpose is attained by providing an erosion electrode with a core of steel, an intermediate layer of copper or a high copper-containing alloy and an outer layer with at least 40% zinc, wherein the steel core has a patented structure with a carbon content of 0.6 to 1 wt. %, which occupies an area of the core of 50 to 75% of the cross-sectional surface of the erosion electrode, wherein the intermediate layer has an area of 5 to 40% and the outer layer has an area of 10 to 30%, and wherein the zinc content of the outer layer lies between 40 and 60 wt. %. The purpose is also attained by providing a method for the manufacture of a high-strength erosion electrode comprising a core of steel, an intermediate layer of copper or a high copper-containing alloy, and an outer layer of an alloy containing at least 40% zinc, wherein a steel with a carbon content of 0.6 to 1 wt. % is used as the core, onto which is applied the intermediate layer of copper or a high copper-containing alloy, wherein an outer layer of zinc or a high zinc-containing alloy is applied onto the intermediate layer, wherein the wire, prior to a first intermediate annealing, is subjected to a diffusion annealing such that on the one hand the outer layer forms an alloy with a zinc content, the melting point of which is higher than the austenitization temperature required for the patenting of the steel core, and on the other hand the diffusion process is carried out so long that, taking into consideration one or rather several following patentings of the erosion wire, the outer layer maintains the desired composition and strength, whereby the erosion electrode is patented during each intermediate annealing.

Thus, an erosion wire of the invention has a steel core K with a carbon content of 0.6 to 1%, whereby a high copper-containing copper alloy is applied as an intermediate layer ZS onto said steel core. This intermediate layer is covered by an outer layer MS which, when the erosion wire is finished, consists of a zinc alloy, the zinc content of which lies between 40 and 60%. The condition for achieving the comparatively high conductivity of the erosion electrode with an equally high strength is that the core has a patented structure, consists advantageously of sorbite, whereby a further layer is arranged between the outer layer and the core, which further layer contains high amounts of copper, that is, it is only slightly alloyed. Silver in the form of the alloy CuAgl has here proven to be particularly advantageous as the alloy element. Also a copper alloy with a small amount of zinc can be advantageously utilized for the intended purpose. An outer layer has been applied to this intermediate layer, which outer layer consists of a zinc alloy, in which the zinc content reaches at least 40% and may reach a maximum of 60%.

In a second embodiment of the present invention, the erosion electrode is formed from a steel core and an outer layer covering the steel core. The steel core has a patented structure, a carbon content of from 0.6 wt. % and occupies an area of the core of 50 to 75% of the cross-sectional surface of the erosion electrode. The outer layer is a zinc alloy having a zinc content of from 40–60% and forms the balance of the cross-sectional surface of the erosion electrode.

A wire electrode of the invention could be manufactured in such a manner that a sleeve out of a brass pipe or brass band is applied to a steel core enveloped with copper, and the composite is thereafter reduced by means of wire drawing. This type of manufacture becomes more problematic the higher the zinc content in the outer layer is supposed to be. A further method could consist of providing a copper-enveloped steel wire with a zinc-containing outer layer via a dipping method. The zinc content could be adjusted at random. The difficulty with this method is to apply the outer layer with an even thickness over the circumference.

A very advantageous method for the manufacture of a wire electrode is that a steel core is enveloped with a copper layer, whereby the structure of the steel core should exist in a patented form. A zinc alloy is thereafter then applied to this copper intermediate layer, whereby in the simplest case the outer layer consists of pure zinc. This is followed by a diffusion annealing, the duration of which is chosen in dependency of the diffusion temperature such that the entire outer layer forms a zinc alloy, the zinc content of which amounts to 60% at a maximum. The duration of the diffusion annealing is furthermore determined such that the demanded areas for the core wire, the intermediate layer and the outer layer adjust, whereby these areas of the three sections are not only important for the strength achieved in the final wire but also for its conductivity. A further decisive factor for the strength, however, and also for the conductivity of the erosion wire is that in the final wire the core consists of a patented structure, whereby the electrical conductivity and strength are equally optimized.

To prepare the erosion electrode of the present invention according to the second embodiment, an erosion electrode of the first embodiment of the present invention is formed and the electrode subjected to repeated diffusion annealing processes to completely consolidate the intermediate layer into the outer layer.

The wire, the core of which should already exist in the patented state, is, after the diffusion annealing has occurred, reduced in its diameter by drawing.

The area of the core on the electrode should lie between 50 to 75% of the entire electrode. The area of the intermediate layer should lie between 5 and 40% and the area of the outer layer between 10 to 30%. If one furthermore meets the demand that the zinc content of the outer layer lies between 40 and 60%, advantageously at slightly above 50%, then one obtains an electrode with a conductivity which lies between 10 and 18 S·m/mm$^2$, whereby at the same time strengths are obtained which lie between 1800 and 2500 N/mm$^2$. It must hereby be noted that the demand for high conductivity and high strength is in contrast, namely an inventive wire with a very high strength has a comparatively low electrical conductivity and vice versa. The wires of the invention can be drawn to a diameter of below 10 $\mu$m, namely, to diameters which are sufficiently small for the up to now known uses. It has thereby been found to be particularly advantageous that these wires with a thin diameter can easily replace the up to now used tungsten and molybdenum wires and are by comparison significantly less expensive to manufacture, show no aging, have lower raw-material costs, and moreover offer a higher safety in manufacture and have constant erosion characteristics. The achieved quality in manufacture is so great that the wire of the invention will practically not break down on the erosion machine, whereas the breakdown of the up to now utilized molybdenum or tungsten wire amounts to up to 50%.

The high strength is particularly advantageous in the case of erosion wires with diameters of above 100 $\mu$m when workpieces with a greater height are to be cut since high wire tensions are required here in order to keep bending and vibrations low.

An electrode of the invention is distinguished by a high conductivity and a comparatively high strength. Moreover, the cutting quality with a high exactness in contours is very good, whereby this precision is favored by the high wire tension based on the high strength of the wire.

What is claimed is:

1. A method of manufacturing a high-strength erosion electrode having a patented steel core and an outer layer of a zinc alloy, said method comprising the steps of:

providing a steel core having a carbon content of from 0.6 to 1 wt. %;

applying an intermediate layer of copper or a high copper content-containing alloy onto the steel core;

applying an outer layer of zinc or a high zinc content-containing alloy onto the intermediate layer to form a wire electrode;

performing diffusion annealing on the wire electrode for a period of time sufficient to completely consolidate the intermediate layer into the outer layer and form an outer layer of a zinc alloy having a zinc content of from 40–60% and a melting point higher than the austenitization temperature required for patenting of the steel core; and performing intermediate annealing on the wire electrode under conditions sufficient to subject the wire electrode to a patenting treatment and form the high strength erosion electrode.

2. A method of manufacturing a high-strength erosion electrode having a patented steel core and an outer layer of a zinc alloy, said method comprising the steps of:

applying an intermediate layer of copper or a high copper-content containing alloy onto a patented steel wire having a carbon content of from 0.6 to 1 wt. %;

applying an outer layer of zinc or a high zinc content-containing alloy onto the intermediate layer;

performing diffusion annealing to completely consolidate the intermediate layer into the outer layer and form a brass outer layer having a zinc content of 40–60% and a predetermined strength;

deforming the wire to reduce the diameter thereof; and performing a patenting step after each deformation step until the wire reaches its final diameter.

3. An erosion electrode consisting of a patented steel core and an outer layer containing 40–60 wt. % zinc, said patented steel core having a carbon content of 0.6 to 1 wt. % and occupying an area of 50 to 75% of the cross-sectional area of the erosion electrode.

4. The erosion electrode according to claim 3, wherein the conductivity of the erosion electrode is at least 10 S·m/mm$^2$.

5. The erosion electrode according to claim 3, wherein the strength of the erosion electrode is at least 1800 N/mm$^2$.

6. The erosion electrode according to claim 3, wherein the conductivity and the strength of the erosion electrode is from 10–18 S·m/mm$^2$ and 1800–2500 N/mm$^2$ respectively.

7. The erosion electrode according to claim 3, wherein the erosion electrode has a diameter of less than 10 $\mu$m.

* * * * *